Patented Apr. 15, 1952

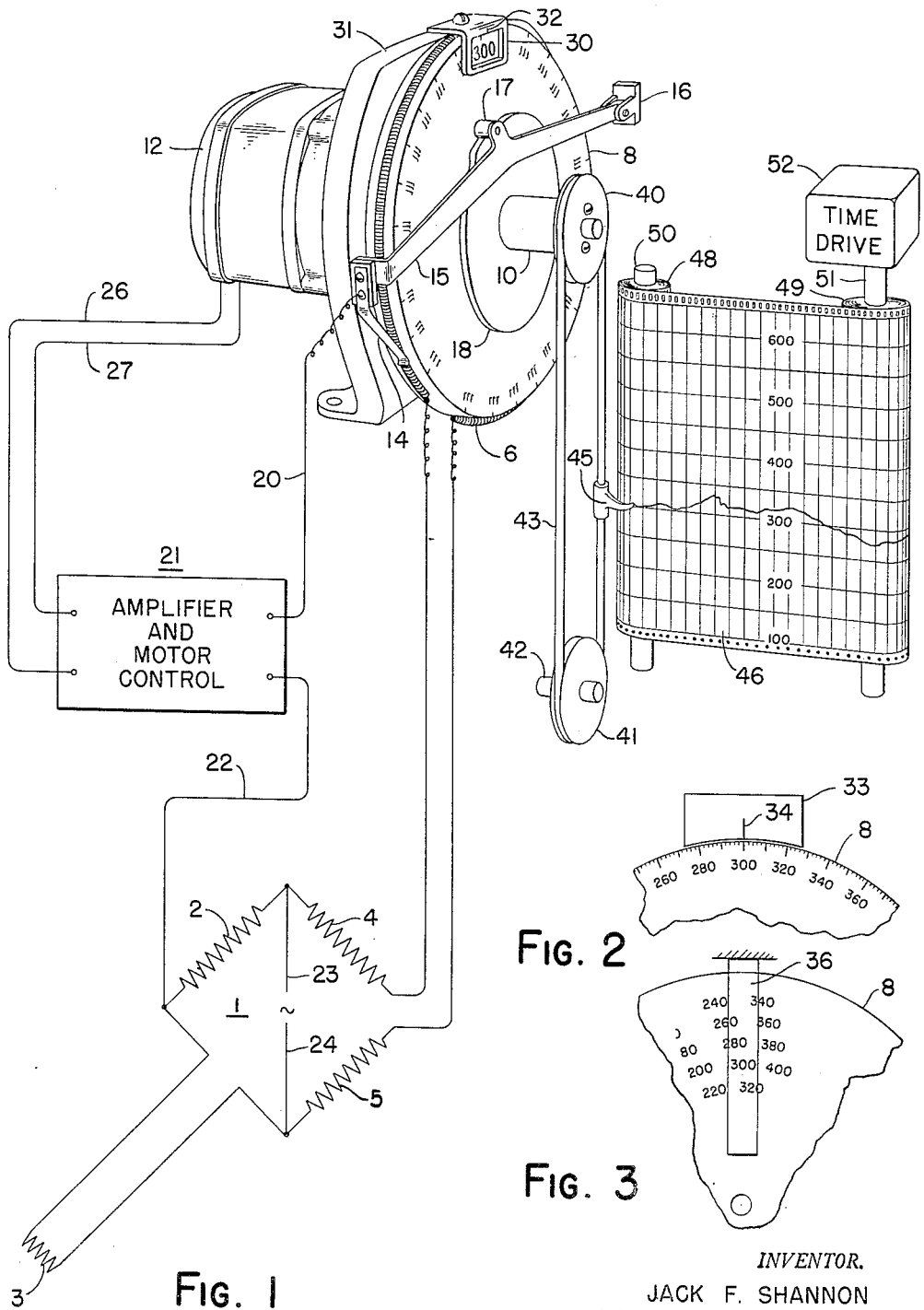

2,593,351

UNITED STATES PATENT OFFICE 2,593,351

REBALANCING INDICATING INSTRUMENT

Jack F. Shannon, Euclid, Ohio, assignor to Bailey Meter Company, a corporation of Delaware Application February 28, 1947, Serial No. 731,573

9 Claims. (Cl. 73—362)

1

This invention relates to indicating and recording instruments, and more particularly to drive control means for such instruments.

The measurement of variable conditions, such as temperatures, is frequently accomplished by instruments having balanceable networks which are adapted to be unbalanced by a variation in the condition and to effect, when the networks are unbalanced, an operation of a rebalancing means. An unbalance in response to the change in temperature may be obtained either by including in the network an element which varies in resistance with changes in the temperature, or by subjecting the network to an unbalancing potential from an element, such as a thermocouple, which is subjected to the temperature. The rebalancing means may include a motor which operates in response to the unbalance and positions a member which either adjusts resistance in the system or varies a voltage imposed on the system, until a balance is again obtained.

The resistance or voltage output of known elements may vary in a straight line relationship with changes in temperature up to certain values, but fail to follow such a relationship when these values are exceeded. Unbalances of the network at temperatures exceeding such values are, therefore, not directly proportional to the temperature changes, and the operation of the rebalancing means does not give a direct indication of temperature. If the adjustment of the resistance in the network or the variation of the voltage imposed thereon does not follow a straight line relationship with the operation of the rebalancing motor, then the motor will not operate uniformly for equal temperature changes and will not give a direct indication of temperature.

An object of my invention is to provide an improved control means for a recording or indicating instrument. Another object is to provide improved means for rebalancing a balanceable network adapted for use with a recording or indicating instrument. Still another object is to provide a balanceable network with an improved rebalancing means which is operative to give a direct indication of the condition affecting the balance of the network. Yet another object is to provide improved means for effecting operation of a rebalancing motor for a balanceable network, in direct proportion to changes in a condition which produces unbalance. Other objects will appear in the course of the following description.

A preferred form of my invention may include a slide-wire resistance connected into a bridge circuit and having a contact which is connected through a motor control circuit to a diagonally

2 opposite point of the bridge for effecting operation of the motor when the circuit is unbalanced. The motor may be connected to the slide-wire for moving it relative to the contact and dividing its resistance in the legs of the bridge so as to rebalance the network. In order that the motor may operate in direct proportion to the changes in the condition producing an unbalance of the bridge, means may be provided for moving the contact relative to the slide-wire so as to compensate for any inaccuracies in the bridge unbalancing means, for any lack of uniformity of the slide-wire, or for anything else in the system, other than temperature changes, that may affect operation of the motor. If desired, the motor could move the contact while the slide-wire was positioned by suitable compensating means. Instead of using a regular bridge circuit with the instrument, there may be used a circuit in which a voltage determined by the condition is directly opposed by a balancing voltage to control the operation of a motor. In such case, the balancing voltage may be regulated by the motor and by means which compensates for anything tending to effect operation of the motor in such a way that it does not give a direct indication of the condition.

There is shown in the accompanying drawing one form which my invention may assume in practice. In this drawing:

Fig. 1 is a schematic diagram of a bridge network having my improved balancing control means associated therewith so as to give a direct indication and record of a condition to be measured.

Figs. 2 and 3 show portions of different forms of indicating means.

Referring to Fig. 1, it will be noted that there is shown a bridge, generally designated 1, having a fixed resistance 2 forming one of its legs, a resistance element 3 forming an adjacent leg and varying in resistance in accordance with a temperature to be measured, and fixed resistances 4 and 5 cooperating with portions of a slide-wire resistance 6 to form the opposite pair of legs. The slide-wire 6 is mounted on the periphery of a circular plate 8 connected to a shaft 10 which is rotated through suitable gearing mechanism, not shown, by a motor 12. A flexible contact 14 slideably engages the wire 6 and is fixed to one end of an arm 15 which is pivotally attached at its other end to a stationary support 16. A roller 17 is carried by the arm 15 at a point between its ends and engages a cam 18 fixed to the shaft 10. The contact 14 is suitably insulated from the arm 15 and is connected by a conductor 20 to one terminal of an amplifier and motor control circuit 21. Another terminal of the control 21 is connected by a conductor 22 to a point on the bridge diagonally opposite from the contact 14. Other diagonally opposite points of the bridge are connected by conductors 23 and 24 to a source of alternating current. The amplifier and motor control 21 may be similar to that disclosed in the Hornfeck application Serial No. 693,290, filed August 27, 1946, now Patent 2,544,790, dated March 13, 1951. This circuit is adapted to supply current through conductors 26 and 27 to the motor 12 for effecting operation of the latter in one direction or another depending upon the unbalance of the bridge.

Inscribed upon the face of the plate 8 are figures which may be viewed through a window in a member 30 attached to a supporting frame 31 for the motor 12. The figure within the window and its position with respect to a reference mark 32 provides an indication of the temperature to which the resistance element 3 is subjected. Figs. 2 and 3 show other means adapted for use with the plate 8 to indicate the value of the condition measured. In Fig. 2, a block 33 is supported at the periphery of the plate and is provided with a reference mark 34 for indicating the point on the plate at which the reading is to be taken. This form of indicating means has no part projecting over the edge of the plate and possibly concealing the figures thereon, as in Fig. 1. Fig. 3 shows means supported at the edge of the plate and having an elongated window 36 through which the figures on the plate may be viewed. The point on the plate centered within the sides of the window indicates the figure to be read.

In order that a record may be obtained of the condition measured, there is provided, as shown in Fig. 1, a pulley 40 fixed to the shaft 10, a pulley 41 journaled on a shaft 42, and a belt 43 extending about the pulleys 40, 41 and carrying a pen 45 which is adapted to mark upon a chart 46. The chart is shown herein wrapped about rollers 48 and 49 fixed to shafts 50, 51, and suitable driving means 52 is adapted to drive the shaft 51 and roller 49 for moving the chart relative to the pen 45.

If, in the operation of the mechanism, the contact 14 was held stationary, an unbalance of the bridge would cause the motor 12 to operate and position the slide-wire 6 relative to its contact until the bridge was rebalanced. Any lack of uniformity in the resistance of the slide-wire, or a failure of the resistance element 3 to vary in resistance in a straight line relationship with temperature, would result in an operation of the motor through different degrees for equal changes in temperature, and an uneven distribution of figures on the plate 8 and the chart 46 would be required for indicating the true temperatures. A positioning of the contact 14 by the cam 18, while the motor positions the slide-wire 6, makes it possible, however, to correct for any inaccuracies in the system and to obtain a rotation of the plate 8 in direct proportion to the actual changes in temperature. The shape of the cam 18 may be determined by subjecting the element 3 to different known temperatures and positioning the contact 14 manually until the temperatures indicated on the plate 8 and chart 46 correspond to the known temperatures. The path followed by the lower edge of the roller 17 during such measurements determines the shape of the cam. The arm 15 is moved through a comparatively small angle by the cam, and the flexibility of the contact 14 is sufficient to hold it in engagement with the slide-wire while the arm is moved to different positions.

As a result of my invention, there is provided an improved mechanism for measuring the values of a variable condition. It will be appreciated that the motor 12 could as well be connected to position the contact 14 while the slide-wire was positioned by the cam or other suitable means. It will also be understood that my invention is applicable to the rebalancing of networks other than the Wheatstone bridge type shown herein.

While there is shown in this application one form which my invention may assume in practice, it will be understood that it may be modified and embodied in various other forms without departing from its spirit or the scope of the appended claims.

What I claim as new, and desire to secure by Letters Patent of the United States, is:

1. A measuring instrument comprising, in combination, a balanceable network having an element operating to effect an non-linear unbalance in response to changes in a condition to be measured, rebalancing means comprising a uniform resistance element having a contact, each movable relative to the other and electrically connected into said network, a motor electrically connected to said network and operating on an unbalance of the latter, means mechanically connecting said motor to said resistance element for effecting movement thereof in direct proportion to motor movement, and means mechanically connecting said motor to said contact for effecting movement thereof in a manner predetermined to compensate between the non-linear unbalance and the linear movement of the balancing resistance.

2. A measuring instrument comprising, in combination, a balanceable network having an element operating in a non-linear manner in response to changes in a condition to be measured to effect an unbalance, rebalancing means comprising voltage divider and adjustabe top elements electrically connected into said network and movable relative to each other, a motor electrically connected to said network and operating on an unbalance of the latter, means operatively connecting said motor to one of said elements for effecting movement thereof in direct proportion to its operation, means associated with said last mentioned means for indicating the value of the condition measured, and means operatively connecting said motor to the other of said elements for effecting movement thereof in a manner to compensate for said non-linear effect whereby the motor operates in direct proportion to the changes in condition.

3. A measuring instrument comprising, in combination, a balanceable network having an element operating to effect a non-linear unbalance in response to changes in a condition to be measured, rebalancing means comprising a uniform resistance element having a contact, each movable relative to the other and electrically connected into said network, a motor electrically connected to said network and operating on an unbalance of the latter, means operatively connecting said motor to said resistance element for effecting movement thereof in direct proportion to its operation, means associated with said last mentioned means for indicating the position of said resistance element as a value of the condition measured, and means operatively connecting said motor to said contact for effecting movement thereof in a manner predetermined to compensate between the non-linear unbalance and the linear movement of the balancing resistance.

4. The instrument of claim 3 in which the last mentioned means includes a cam actuated by said motor for positioning said contact in said manner.

5. A measuring instrument comprising, in combination, a Wheatstone bridge having an element operating to effect a non-linear unbalance in response to changes in a condition to be measured, a slide-wire having uniform resistance adapted to be distributed in legs of said bridge for rebalancing the latter, a contact for said slide-wire resistance, means supporting said slide-wire and said contact for movement relative to each other, a motor, means electrically connecting said motor to said contact and to a diagonally opposite point on said bridge for effecting its operation on an unbalance of the latter, means operatively connecting said motor to said slide-wire for effecting movement of the latter in direct proportion to its operation, means associated with said last mentioned means for indicating the position of said slide-wire as a value of the condition measured, and means operatively connecting said motor to said contact for effecting movement thereof in a predetermined manner, the movement of said slidewire and contact relative to each other being such as to effect an operation of the motor in direct proportion to changes in the condition.

6. A measuring instrument comprising, in combination, a Wheatstone bridge having an element operating to effect an unbalance in response to changes in a condition to be measured, a slide-wire resistance adapted to be distributed in legs of said bridge for rebalancing the latter, a circular plate supporting said slide-wire on its periphery and mounted for rotation, a contact engaging said slide-wire, an arm pivotally supported at one end and carrying said contact at its other end, a motor, means electrically connecting said motor to said contact and to a diagonally opposite point on said bridge for effecting its operation on an unbalance of the bridge, means operatively connecting said motor to said plate for rotating the latter, a cam connected for rotation with said plate, means carried by said arm between its ends and operatively engaging said cam, and means supported adjacent the periphery of said plate and having a reference mark cooperating with figures on said plate for indicating the values of the condition measured.

7. A measuring instrument comprising, in combination, a Wheatstone bridge having an element operating to effect an unbalance in response to changes in a condition to be measured, a slide-wire resistance adapted to be distributed in legs of said bridge for rebalancing the latter, a circular plate supporting said slide-wire on its periphery and mounted for rotation, a contact engaging said slide-wire, an arm pivotally supported at one end and carrying said contact at its other end, a motor, means electrically connecting said motor to said contact and to a diagonally opposite point on said bridge for effecting its operation on an unbalance of the bridge, means operatively connecting said motor to said plate for rotating the latter, a cam connected for rotation with said plate, means carried by said arm between its ends and operatively engaging said cam, an indicating member cooperating with a chart having uniformly spaced figures, and means connecting said motor to said indicating member for moving the latter over said chart in a manner to indicate thereon the values of the condition measured.

8. A measuring instrument comprising, in combination, a balanceable network having an element operating to effect an unbalance of non-uniform character in response to changes in a condition to be measured, rebalancing means comprising a pair of elements including a linear impedance and a slider electrically connected into said network and movable relative to each other, a motor electrically connected to said network and operating upon an unbalance of the latter, means operatively connecting said motor to one of said pair of elements for effecting movement thereof in direct proportion to motor operation, means operatively connecting said motor to the other of said pair of elements for moving it in a manner predetermined by said non-uniform character, the movement of said elements relative to each other are such as to effect an operation of the motor in direct proportion to changes in the condition, and means associated with said motor for exhibiting the position of the latter as the value of the condition measured.

9. A measuring instrument comprising, in combination, a balanceable network including an element operating in a non-uniform manner in response to changes in a condition for effecting an unbalance, means including impedance varying elements of uniform character movable relative to each other for rebalancing said network, a device operating on an unbalance of said network and simultaneously positioning said elements relative to each other for effecting rebalance, the simultaneous positioning of said elements by said device being such that an operation of the device in direct proportion to the changes in the condition is obtained in effecting rebalance, means for moving a strip chart having uniformly distributed vertical graduations in a horizontal path in accordance with time, a marking pen engageable with said chart, and means connecting said device to said marking pen for moving the latter across said chart normal to its direction of movement, said last mentioned means being constructed to move the pen in linear relation to the rotation of the device.

JACK F. SHANNON.

REFERENCES CITED

The following references are of record in the file of this patent:

UNITED STATES PATENTS

| Number | Name | Date |
|---|---|---|
| 1,332,182 | Leeds | Feb. 24, 1920 |
| 1,684,138 | Nixdorf | Sept. 11, 1928 |
| 2,007,556 | Behr | July 9, 1935 |
| 2,032,558 | Finch | Mar. 3, 1936 |
| 2,113,069 | Ross et al. | Apr. 5, 1938 |
| 2,208,562 | Locke | July 23, 1940 |
| 2,275,317 | Ryder | Mar. 3, 1942 |
| 2,312,945 | Williams, Jr. | Mar. 2, 1943 |
| 2,319,322 | Hefel | May 18, 1943 |
| 2,332,288 | Zeitlin | Oct. 19, 1943 |
| 2,349,963 | Harrison | May 30, 1944 |
| 2,412,356 | Roberts et al. | Dec. 10, 1946 |
| 2,412,639 | Trougott | Dec. 17, 1946 |
| 2,441,226 | Phillips et al. | May 11, 1948 |
| 2,450,263 | Wise | Sept. 28, 1948 |
| 2,457,532 | Cunningham | Dec. 28, 1948 |